United States Patent [19]
Beermann et al.

[11] 3,859,392
[45] Jan. 7, 1975

[54] CARBAMIDO-ALKYL-PHOSPHINIC ACID ALKYL ESTERS

[75] Inventors: Claus Beermann, Neu-Isenburg; Martin Reuter, Kronberg/Taunus, both of Germany

[73] Assignee: Farbwerke Hoechst Aktiengesellschaft Vormals Meister Lucius & Bruning, Frankfurt, Germany

[22] Filed: Dec. 11, 1972

[21] Appl. No.: 313,811

Related U.S. Application Data

[63] Continuation of Ser. No. 67,587, Aug. 27, 1970, abandoned.

[30] Foreign Application Priority Data

Sept. 13, 1969 Germany............................ 1946574

[52] U.S. Cl............. 260/943, 260/45.9 R, 260/968, 260/999
[51] Int. Cl.............................................. C07f 9/32
[58] Field of Search.................................... 260/943

[56] References Cited
UNITED STATES PATENTS
2,908,605   10/1959   Beriger et al. ..................... 260/943
FOREIGN PATENTS OR APPLICATIONS
239,951   8/1969   U.S.S.R............................. 260/943

OTHER PUBLICATIONS

Pudovik et al., Bull. Acad. Sci., USSR, Div. Chem. Sci. (English translation) 1952, pages 657–660.
Schicke, Chemical Abstracts, Vol. 63 (1965) page 6862.

Primary Examiner—Lorraine A. Weinberger
Assistant Examiner—Richard L. Raymond
Attorney, Agent, or Firm—Curtis, Morris & Safford

[57] ABSTRACT

Carbamido alkyl phosphinic acid alkyl esters are obtained by reacting alkyl phosphonic acid mono alkyl esters with amides of unsaturated carboxylic acids. The products are useful as insecticides and as additives for plastics which render said plastics flame retardant.

7 Claims, No Drawings

CARBAMIDO-ALKYL-PHOSPHINIC ACID ALKYL ESTERS

This is a continuation of application Ser. No. 67587, filed Aug. 27, 1970, now abandoned.

The present invention relates to carbamido-alkyl-phosphinic acid alkyl esters and a process for their preparation.

It is known (Houben-Wayl, Vol. 12/1, page 258–259) that phosphonous acid monoesters may be added on $\alpha,\beta$-unsaturated carboxylic acid esters or nitriles, $\alpha,\beta$-unsaturated ketones, alkyl-vinylsulfones, acetic acid vinyl esters and $\alpha,\beta$-acetylenic carboxylic acid esters in the presence of peroxidic catalysts, preferably in the presence of alcoholates. However, such an addition on $\alpha,\beta$-unsaturated carboxylic acid amides is hitherto unknown.

It has now been found that lower alkyl-phosphonous acid monoalkyl esters can be added on unsaturated carboxylic acid amides, with formation of carboamido-alkyl-phosphinic acid alkyl esters, according to the following reaction scheme:

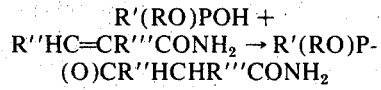

R'(RO)POH +
R''HC=CR'''CONH$_2$ → R'(RO)P-(O)CR''HCHR'''CONH$_2$ in which R represents an alkyl radical, especially a n-alkyl radical, having up to 18, preferably up to 4, carbon atoms, R' represents a lower alkyl radical having up to 4 carbon atoms, R'' represents a hydrogen atom, a lower alkyl radical having up to 4 carbon atoms or a phenyl radical, optionally substituted by chlorine or bromine atoms or lower alkyl and alkoxy groups having up to 4 carbon atoms, especially methyl and methoxy groups, and R''' stands for a hydrogen atom or a lower alkyl radical having up to 4 carbon atoms.

As unsaturated carboxylic acid amides to be used in the process of the invention, for example methacrylamide, cinnamic acid amide, crotonamide and, especially, acrylamide are suitable substances. Suitable lower alkyl-phosphonous acid monoalkyl esters are for example ethyl-phosphonous acid monoethyl ester, butyl-phosphonous acid methyl ester and especially the monoesters of methyl-phosphonous acid, for example its ethyl, propyl, octyl and, especially, methyl esters. Advantageously, the reaction is accelerated by catalysts, preferably by alkali metal alcoholates, for example sodium ethylate or sodium methylate, dissolved in the correspondent anhydrous alcohols. Advantageously, the alcoholate of the formula ROM, in which R has the aforementioned meaning and M stands for an alkali metal atom, is used.

The addition of inert diluents and solvents, for example ethanol, dimethylformamide or ethyl acetate, as well as of an excess of one of the reactants, is possible, though not necessary. In the case of slowly reactive compounds, an excess of the ester can be of advantage, since it can be easier removed.

The process is advantageously carried out at temperatures of from about 10° to about 90°C, preferably of from about 30° to about 60°C; cooling being recommended in the beginning in order to control the exothermic reaction. The course of the reaction can be followed up by observation of the decrease of the iodine number of the component mixture, which iodine number drops to a few per cent of its value in the beginning - unless an excess of the unsaturated amide is used. At last, any additional solvents are eliminated by distillation, advantageously at lowered pressure, which operation causes the solidification of the reaction products.

For purifying purposes, the reaction products may be recrystallized from a bit of ethanol or acetonitrile or from much ethyl acetate; they are very easily soluble in water and methanol.

The products of the invention are used as insecticides, and above all for the manufacture of self-extinguishing plastics. In this latter case, the new compounds are incorporated especially into polyester and polyurethane plastics before they are shaped.

In the case of substrates having active hydrogen atoms it is also possible to add a low percentage of the new compounds to the starting materials, which causes the reactive group to react with the isocyanates, thus fixing the new flame retardent compound in the substrate by means of a chemical bond.

The quantities of the new compounds and the methods of their addition to the plastics are according to normal standards, and they can be easily found out by the expert in simple preliminary tests.

The following examples illustrate the invention.

EXAMPLE 1

85 g (1.2 mols) of acrylamide, inhibited with 0.2 g of phenyl-$\beta$-naphthylamine, were added at normal temperature to 130 g (1.2 mols) of methyl-phosphonous acid monethyl ester in a flask provided with stirrer, and dissolved completely. To this clear solution, the iodine number of which was 138, and the pH of which was 2.8 when a sample was diluted with the same amount of water, 15 cc. of 2N sodium ethanolate in ethanol were added dropwise within 10 minutes, the pH slowly rising to 6.0 and the temperature to 40°c. This temperature was then maintained by means of external cooling. The main reaction ceased after about 30 minutes (pH 6.1), but the exothermic reaction started again for some minutes after addition of 1 cc. of 2N sodium ethanolate solution at 40°C. This operation was repeated three times at 40°C after 30 minutes each (pH unchanged at 6.1 despite addition of 2 times 1 cc. of 2N sodium ethanolate solution). The iodine number had now dropped to 40. The repeated addition of 1 cc. of 2N sodium ethanolate solution at 40°C resulted only in a very slight self-warming; therefore, the mixture was warmed at 40°C for a further 16 hours. After this time, the reaction mixture had partially crystallized, the iodine number in the oily phase had dropped to 7 and the pH had risen to 9. Now the slowly hardening yellowish crystallized reaction product (softening point at about 60°C) was dissolved hot with 200 cc. of ethanol and freed from traces of insoluble ingredients by filtration. When the solution was cooled, the 2-carbamidoethyl-methylphosphinic acid ethyl ester crystallized in great quantities and was separated from the mother liquid by suction-filtration. After drying in vacuo, the yield was 113 g (about 50% of the theoretical yield). The melting point was constantly at 101°C (not corrected) after a two-times recrystallization first from a bit of ethanol and then from a bit of acetonitrile. The ester was easily soluble in water (pH 7), also in methanol, chloroform and dimethylformamide, sparingly soluble in ethyl acetate and acetone, insoluble in ether and benzene. In the infrared spectrum, the C-N bands showed at 3.1, 5.9 and 7.0 $\mu$, the P=O band at 8.3 $\mu$, the POC band at 9.7 $\mu$, as it was expected.

| Elementary analysis: $C_6H_{14}NO_3P$ (179.16) |
|---|
| Calc.: 40.22% C; 7.88% H; 7.82% N; 17.29% P; 25.14% $C_2H_5O$ |
| Found: 40.0 % C; 8.8 % H; 7.7 % N; 16.8 % P; 24.1 % $C_2H_5O$ |

When the reaction was carried out with addition of 100 g of dimethylformamide or 160 g of ethyl acetate, the same result within the same time was obtained.

EXAMPLE 2

146.5 g (1.2 mols) of methyl-phosphonous acid-n-propyl ester were reacted, as described in Example 1, with 85 g (1.2 mols) of acrylamide, with a total of 24 cc. of 1N sodium propanolate as catalyst. The finally solidified reaction product melted at 90°C after recrystallization from 450 cc. of ethyl acetate; the yield was 75% of the theoretical yield. The infrared spectrum of this carbamido-ethyl-methyl-phosphinic acid propyl ester corresponded with the spectrum of the analogous ethyl ester.

| Elementary analysis; $C_7H_{16}NO_3P$ (193.19) |
|---|
| Calc.: 16.03% P |
| Found: 15.9 % P |

The ester was easily soluble in water and methanol, insoluble in ether.

EXAMPLE 3

113 g (1.2 mols) of methyl-phosphonous acid methyl ester were reacted, as described in Example 1, with 85 g (1.2 mols) of acrylamide, with a total of 18 cc. of 2N sodium methanolate as catalyst.

The finally solidified carbamido-ethyl-methyl-phosphinic acid methyl ester had a melting point of 86°C after recrystallization from 200 cc. of acetonitrile, diluted hot with 200cc. of ethyl-acetate. The product was very hygroscopic and easily soluble in methanol and ethanol. The infrared spectrum corresponded with the spectrum of the analogous ethyl ester.

| Elementary analysis; $C_5H_{12}NO_3P$ (165.13) | |
|---|---|
| Calc.: 18.77% P | Found: 18.7 % P |

EXAMPLE 4

25.9 g (0.24 mol) of methyl-phosphonous acid ethyl ester were reacted, as described in Example 1, with 16.3 g (0.23 mol) of methacrylamide, with addition in portions of a total of 7 cc of 2N sodium ethanolate. After 100 hours at 40°C the iodine number of the mixture dropped from 117 in the beginning to 9. The solidified reaction product (softening point at about 60°C) melted at 114°C after recrystallization from 100 cc. of ethyl acetate; the yield was 22 g (50% of the theoretical yield). After repeated recrystallization from a bit of ethanol, the melting point rose to 136°C.

| Elementary analysis: $C_7H_{16}NO_3P$ (193.19) |
|---|
| Calc.: 43.52%C; 8.35% H; 7.25% N; 16.03% P |
| Found: 42.9 %C; 8.3 % H; 7.6 % N; 15.8 % P |

The infrared spectrum corresponded essentially with the spectrum of the reaction product of Example 1 and thus with the formula $$CH_3(C_2H_5O)P(O)CH_2CH(CH_3)CONH_2$$

EXAMPLE 5

23.8 g (0.22 mol) of methyl-phosphonous acid ethyl ester were reacted, as described in Example 1, with 29.4 g (0.2 mols) of cinnamic acid amide, diluted with 10 cc. of dimethylformamide, with addition in portions of a total of 7.5 cc. of 2N sodium ethanolate. The reactions mixture which is the beginning showed an iodine number of 76, because homogenously oily after addition of the total of the sodium ethanolate and showed an iodine number of 37. After 100 hours of reaction at 40°C, the iodine number dropped to 20, and a great quantity of crystalline precipitate separated. The precipitate showed a melting point of 134°C after suction-filtration and a washing with ethyl acetate. The yield was 13 g = 25.5% of the theoretical yield.

The infrared spectrum corresponded essentially with the spectrum of the reaction product of Example 1 and thus with the formula $$CH_3(C_2H_5O)P(O)CH(C_6H_5)CH_2CONH_2$$

We claim:

1. A compound of the formula

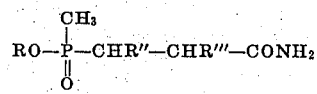

wherein R is alkyl having 1 to 4 carbon atoms; R'' is hydrogen, alkyl having 1 to 4 carbon atoms, phenyl, chlorophenyl, bromophenyl, or lower alkyl phenyl or lower alkoxy phenyl wherein the alkyl groups have 1 to 4 carbon atoms; and R''' is hydrogen or alkyl having 1 to 4 carbon atoms.

2. A compound as in claim 1 wherein R is n-alkyl; R'' is hydrogen, methyl, or phenyl; and R''' is hydrogen or methyl.

3. A compound as in claim 1 wherein R is ethyl and R'' and R''' are hydrogen.

4. A compound as in claim 1 wherein R is n-propyl and R' and R''' are hydrogen.

5. A compound as in claim 1 wherein R is methyl and R' and R''' are hydrogen.

6. A compound as in claim 1 wherein R is ethyl, R' is hydrogen, and R''' is methyl.

7. A compound as in claim 1 wherein R is ethyl, R' is phenyl, and R''' is hydrogen.

* * * * *